Aug. 26, 1924.

C. DESOUTTER 1,506,225

ARTIFICIAL LIMB

Filed April 25, 1922 2 Sheets-Sheet 1

Inventor
Charles Desoutter
By Percy H. Moore
atty

Aug. 26, 1924.

C. DESOUTTER
ARTIFICIAL LIMB

Filed April 25, 1922    2 Sheets-Sheet 2

Inventor
Charles Desoutter
By Percy H. Moore
Atty

Patented Aug. 26, 1924.

1,506,225

UNITED STATES PATENT OFFICE.

CHARLES DESOUTTER, OF LONDON, ENGLAND, ASSIGNOR TO DESOUTTER BROTHERS LIMITED, OF LONDON, ENGLAND.

ARTIFICIAL LIMB.

Application filed April 25, 1922. Serial No. 556,497.

*To all whom it may concern:*

Be it known that I, CHARLES DESOUTTER, a subject of the King of Great Britain and Ireland, residing at London, England, have invented certain new and useful Improvements in or Relating to Artificial Limbs, of which the following is a specification.

This invention relates to artificial limbs and refers to limbs of the kind in which the flexibility of a joint can be varied or adjusted to suit requirements, by means of co-operating friction members on the parts located at the joints.

In the case of artificial legs, in particular it is often desirable to be able to increase or diminish the flexibility of the knee joint, at the will of the wearer; as for walking or running quickly it is desirable to have a considerably stiffer joint than when walking slowly or at rest; and again it is desirable to have simple and convenient means for enabling any play due to wear to be taken up from time to time.

With this object in view it is known to provide the parts of an artificial leg with co-operating conical surfaces, one of said surfaces being adjustable at will with relation to the other by flexing the foot portion or by movement of a socket in the upper portion in which the amputation stump is located, whilst in other constructions a pivotal connection is provided in the form of a bolt having nuts with conical surfaces which are adapted to be adjusted from time to time to take up wear.

According to the general principle of my invention, I provide on each of the parts of the artificial limb, in the neighbourhood of the pivotal connection and at each end or on each side thereof, co-operating tapered or conical surfaces with means for moving at will either the inner friction surfaces towards the outer surfaces or for moving the outer friction surfaces inwardly towards the inner surfaces to increase the friction between the respective surfaces or vice versa.

In the preferred method of applying my invention to an artificial leg, I provide in connection with the lower end of the bucket or upper portion of the leg and around the knee bolt or pivot at each side inwardly directed truncated conical surfaces, and I provide in connection with the upper portion of the lower leg corresponding inwardly directed conical surfaces.

The inner conical surfaces are held rigidly at the required distance apart, whilst the knee bolt is constructed of two or more parts having a screwed connection with means for rotating one of said parts to draw the enlarged heads together, thus increasing the friction between the outer and inner conical surfaces. In an alternative construction the knee bolt is provided with means, such as enlarged heads, for holding the outer conical surfaces in position, and screw means are added for enabling the inner conical elements attached to the bucket and the lower leg respectively. The adjusting means is preferably so arranged that it can be operated by a cord and lever from the pocket, or in some instances it may be operated by the muscles of the stump.

In some cases the desired friction may be increased by providing a number of co-acting conical surfaces in the manner of a friction clutch.

In order that the invention may be readily understood, reference is made to the accompanying drawings which show several constructions according to the invention by way of example.

Figure 1:
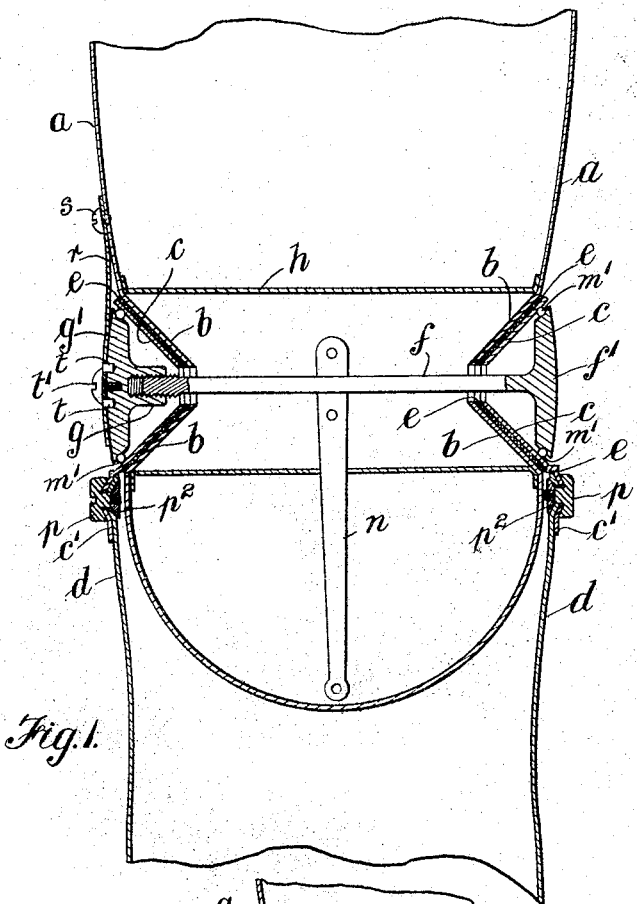
Fig. 1 is a sectional elevation showing the invention applied to the knee joint of an artificial leg, the section being taken through the knee bolt.
Figure 2:
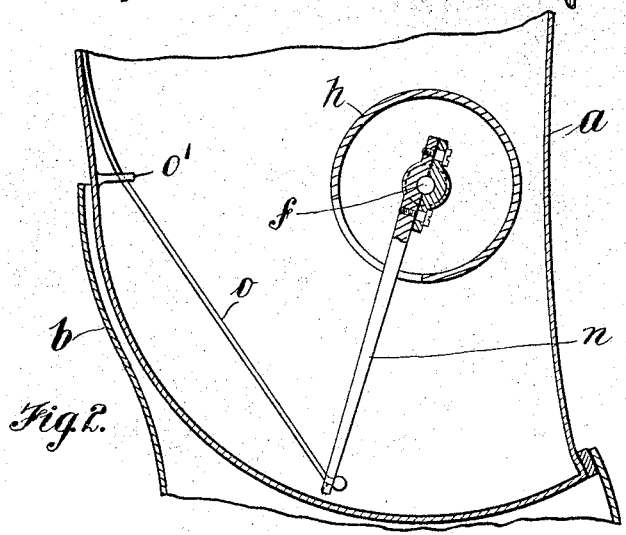
Fig. 2 is a sectional view at right angles to Fig. 1.

Referring to Figs. 1 and 2 of the drawings, the lower end of the bucket or upper portion of the leg is provided on each side with inwardly directed truncated conical surfaces $b$ which form conical seatings for corresponding inwardly directed conical surfaces $c$ on the upper end of the lower leg portion $d$. Between the conical surfaces are provided friction lining $e$ of fibre, leather, cork or any other suitable material.

The co-operating surfaces are normally held together by a knee bolt $f$ provided at one end with an enlarged head $f^1$ seating within the conical aperture of the outer conical surface $c$ and at the opposite end with a threaded nut $g$ formed with a head $g^1$ engaging the aperture in the outer conical surface on the opposite side. The nut $g$ is adjusted on the end of the knee bolt to provide for sufficient play, between the conical surfaces, to permit flexing of the knee joint. Within the bucket portion and around the knee bolt or pivot is a tubular stay $h$ adapted to rigidly support the inner conical surfaces $b$ at the required distances apart.

The knee bolt has secured thereto an arm or lever $n$, to the outer end of which is attached a flexible cord or cable $o$ and when the bolt is rotated in the appropriate direction, the outer conical surfaces $c$, $c$ are forced inwardly to increase the grip between the friction linings $e$, $e$ and the inner conical surfaces $b$, $b$.

In this construction the knee bolt $f$ is rotated by the lever $n$ secured thereto whilst between the outer conical surfaces $c$ of the lower leg portion $d$ and the head $f^1$ and nut $g$ are inserted ball thrust bearings $m^1$. The threaded nut $g$ is further secured against rotation by a plate or strip $r$ secured to the bucket portion $a$ by screws or rivets and provided with pins $t$ engaging recesses in the head $g^1$ of the nut $g$, the free end of said plate being secured to the head by a screw $t^1$. The tubular stay $q$ is slotted to permit of the necessary movement of the lever $n$.

The arm or lever $n$ is preferably clamped to the bolt $f$ in the manner shown in Fig. 2, so as to permit of adjustment.

The conical surfaces $c$ are preferably attached to the lower leg portion $d$ by bolts $p$ passing through the extension $c^1$ of said surfaces. The sheet metal surrounding the bolt hole is preferably pressed or stamped to conical or tapered form, as shown in Fig. 1, the under surface of the head of the bolt $p$ and the inner surface of the nut $p^2$, being shaped to correspond, so that when the nut is screwed home the parts are firmly secured together.

The control wire or flexible cord, $o$ is preferably passed through the guide or eye $o'$ and upwardly so as to enable the same to be operated from the pocket, or if desired it may be arranged to be operated by the muscles of the stump of the leg.

Figure 3:
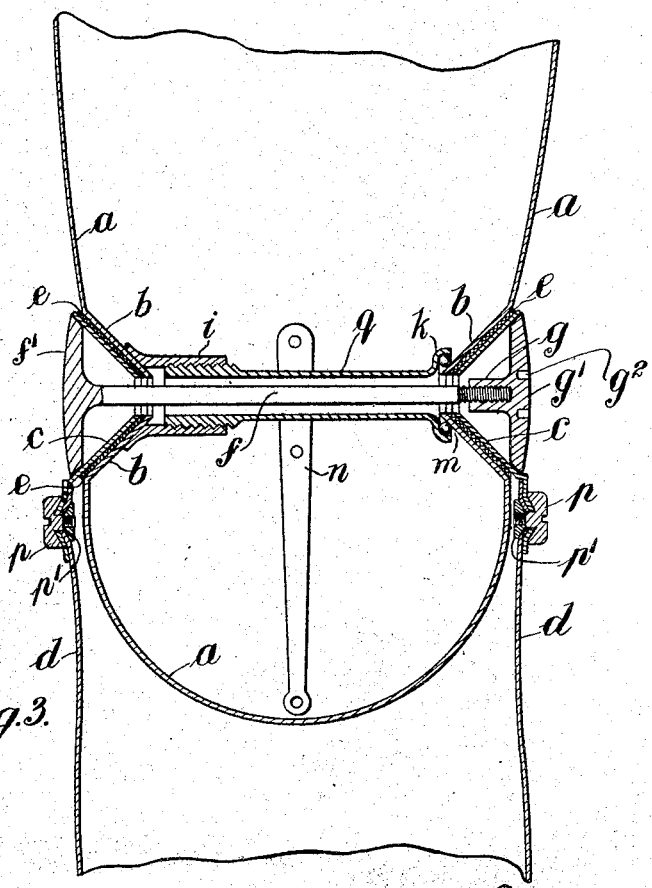
Fig. 3 is a view similar to Fig. 1, of a modified construction.

Fig. 3 shows a modified construction in which instead of pressing the outer conical surfaces $c$ inwardly to increase the friction at the knee joint, the inner conical surfaces are forced outwardly.

Surrounding the knee bolt or pivot $f$ is a sleeve or tubular member $q$ having at one end a threaded engagement with a socket portion $i$ fixed to the inner conical surface on one side of the leg. The opposite end of the sleeve $q$ is provided with a cup like recess or aperture $k$ for the reception of the balls $m$ inserted between the bottom of said recess and the inner face of the conical surface $b$ on the opposite side of the knee joint. This sleeve $q$ and the portion $i$ thereon rigidly support the inner conical surfaces $b$.

The nut $g^1$ may be provided with holes $g^2$ for the reception of a suitable tool to enable the required adjustments to be made to take up wear.

Figure 4:
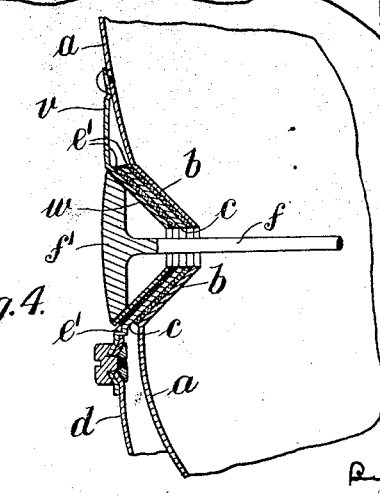
Fig. 4 shows a construction in which a series of conical surfaces are employed.

In the construction shown in Fig. 4, I provide a plurality of conical surfaces between which are located friction linings $e^1$ of suitable material.

The bucket portion $a$ is provided with an inner conical surface $b$ and has secured thereto strips or plates $v$ provided with a conical outer surface or surfaces $w$. Between the friction linings $e^1$ is located a conical surface $c$ attached to the lower leg portion $d$. With this construction the friction at the joint may be varied by pressing the inner conical surfaces $b$, $b$ outwardly or by drawing the outer conical surfaces inwardly as previously described, with reference to Figs. 1 to 3.

If desired a spring or springs (not shown) may be provided for returning the lever $n$ to its normal position.

What I claim as my invention and desire to secure by Letters Patent of the United States of America is:—

1. An artificial limb comprising upper and lower leg sections made of relatively thin sheet metal, the sheet metal of each of said sections being provided with coacting, nesting conical friction surfaces at each side of the knee joint, the conical surfaces of one section being arranged co-axially with the conical surfaces of the other section, a two part knee bolt pivotally connecting said leg sections together, mounted co-axially with said friction surfaces, means for securing one of said parts against movement, and means for axially moving at will the other part to increase or decrease the friction between the inner and outer friction surfaces, for the purposes set forth.

2. An artificial limb comprising upper and lower leg sections made of relatively thin sheet metal, the sheet metal of each of said sections being provided with coacting, nesting conical friction surfaces at each side of the knee joint, the conical surfaces of one of said leg sections being arranged co-axially with the conical surfaces of the other section, a two part knee bolt pivotally connecting said leg sections together, the parts of said bolt being screw threadedly connected together and co-operating with said friction surfaces, means for securing one of said parts against rotation and means for rotating at will the other part to increase or decrease the friction between the inner and outer friction surfaces, for the purposes set forth.

3. An artificial leg comprising upper and lower leg sections made of relatively thin sheet metal, the sheet metal of each of said sections being provided with inner and outer coacting nesting conical friction surfaces at each side of the knee joint, the conical surfaces of one of said leg sections being arranged coaxially with the conical surfaces of the other section, a knee bolt pivotally connecting said leg sections together and passing axially through said conical friction surfaces, a head on said bolt, a nut having a screw threaded connection with said bolt, means for retaining said nut against rotation, means for rigidly supporting the inner friction surfaces, and means for rotating said bolt at will to increase or decrease the friction between said inner and outer friction surfaces, for the purposes set forth.

4. An artificial leg comprising upper and lower leg sections made of relatively thin sheet metal, the sheet metal of each leg section being provided with coacting nesting conical friction surfaces on each side of the upper leg and the lower leg sections at the knee joint, a knee bolt pivotally connecting said leg sections, formed of two parts mounted co-axially with said friction surface, means for securing one of said parts against movement and means for axially moving the other part at will to increase or decrease the friction between the co-operating friction surfaces, for the purposes set forth.

5. An artificial leg comprising upper and lower leg sections made of relatively thin sheet metal, the sheet metal of each leg section being provided with inner and outer coacting nesting conical friction surfaces, on each side of the leg sections at the knee joint, a knee bolt pivotally connecting said leg sections, formed of two headed parts mounted coaxially with said friction surfaces, the heads of said bolt engaging the outermost of said conical friction surfaces, means for bracing the inner conical friction surfaces, and means for drawing the heads of said bolts together to increase the friction between said inner and outer friction surfaces.

Signed at London, in the county of London, England, this 31st day of March, A. D. 1922.

CHARLES DESOUTTER.